June 9, 1936.  M. C. PHILLIPS ET AL  2,043,461
CIRCUIT CONTROLLING SYSTEM
Filed Jan. 16, 1935
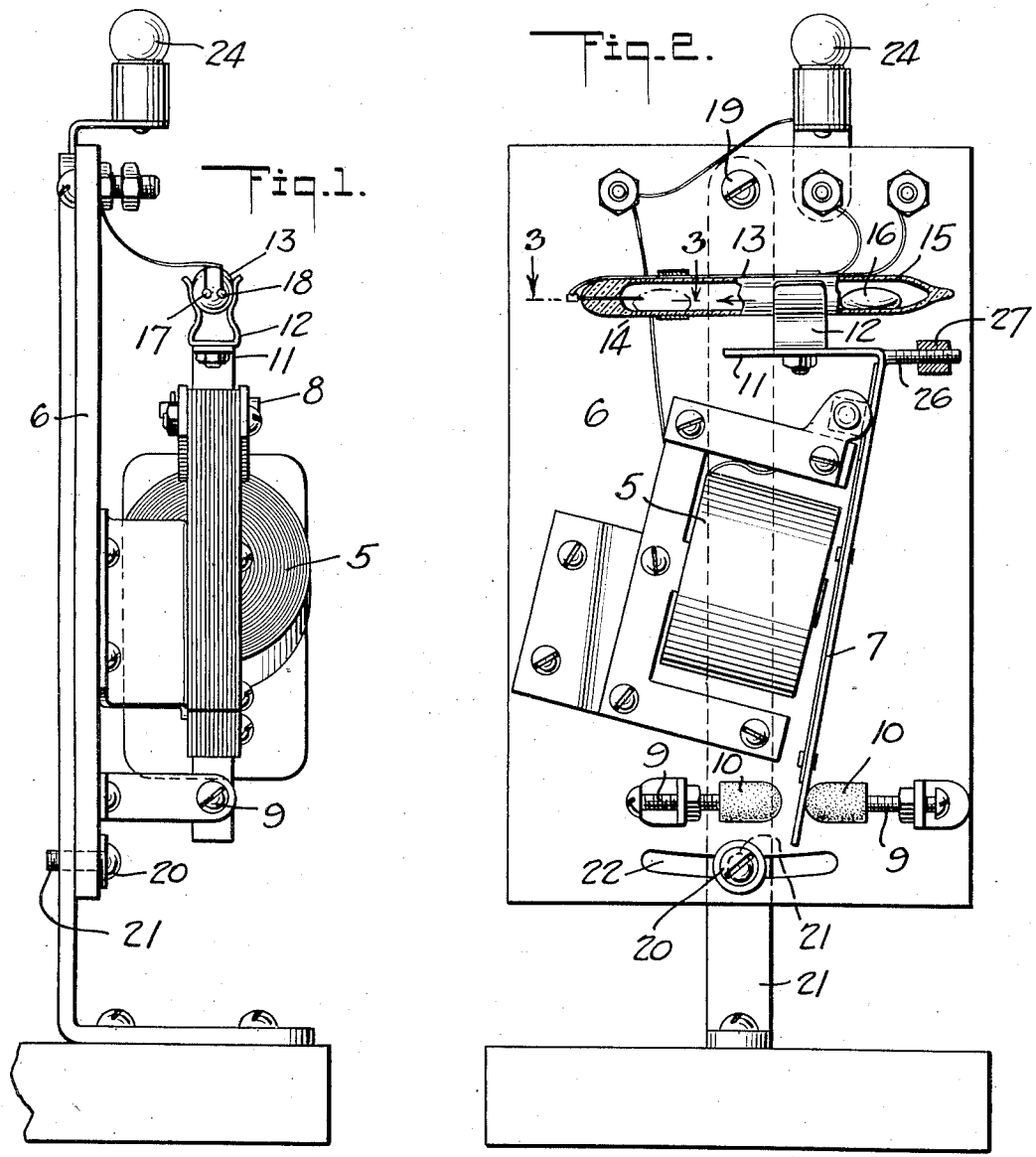
INVENTORS.
MILFORD C. PHILLIPS
BY VERNON HAVENNER
ATTORNEYS.

Patented June 9, 1936

2,043,461

UNITED STATES PATENT OFFICE 2,043,461

CIRCUIT CONTROLLING SYSTEM

Milford C. Phillips, North Hollywood, and Vernon Havenner, Bell, Calif.

Application January 16, 1935, Serial No. 2,132

1 Claim. (Cl. 200—90)

This invention relates to circuit controlling systems, and has for an object the utilization of force produced by magnetic induction to set in motion an inert metallic mass, which, when once set in motion, will continue in motion by alternate exchange or substitution of the force of gravity for magnetic inductive force or vice versa, and for employing the mass to open and close an electric circuit at regular intervals.

Another object is to provide means for producing regularly occurring electrical impulses and utilizing these impulses to control actuation of a signaling device.

A still further object is to provide means by which the inductive action of an electromagnetic coil can be controlled entirely by means which is set in motion by armature movements of the coil.

Another object is specifically directed to the provision of an oscillatory body, the oscillations of which are made to occur regularly and in respective planes to cause the heretofore described inert mass to be placed in motion first in one direction and then another and periodically bridge the positive and negative electrodes of a conventional lighting circuit and thereby close the circuit and cause the coil to be energized when the mass reaches the limit of its distance in one direction and again open the circuit immediately following energization of the coil, and to repeat these operations in operative alternation.

Another object of the invention relates to means for electro-magnetically imparting successive driving impulses to an oscillatory body which is in the form of a hollow normally overbalanced lever and adapted to be tilted the instant the circuit is broken in order that the inertia mass contained therein will gravitate to an open circuit position and then return to close the circuit, partly due to inertia and partly to gravitation of the mass.

Another feature of the invention is to provide an oscillatory lever in the form of a tube in which mercury is employed as an inertia mass and from which tube the air has been properly excluded to prevent oxidation of the mercury.

Another object of the invention is to provide means for governing or controlling the measure of elapsed time occurring between the opening and the closing of the circuit, thus enabling the circuit to be controlled at predetermined times.

Another object is to provide a circuit controlling system which is adaptable to either batteries or the conventional 110 volt A. C. or D. C. lighting circuits.

Another object is to provide means whereby a balanced adjustment of the armature of the electro-magnetic coil can be had so that the armature will positively function with great accuracy.

The invention also comprehends other features of construction which, with those above specified, are fully described hereinafter and specifically recited in the hereto appended claims.

The invention will be better understood by reference to the accompanying drawing, which Figure 1 is a view in side elevation of the device, Figure 2 is a view in front elevation thereof, Figure 3 is a detail section taken approximately on the line 3—3 of Figure 2, Figure 4 is a schematic illustration of the device connected in a conventional lighting circuit.

In carrying the invention into practice, use is made of an electro-magnetic coil 5 of any suitable well known construction, but preferably one of the type employing a laminated core of silicon steel. The coil is preferably obliquely mounted at one side of a supporting panel 6 and its armature 7 is pivotally suspended at its upper end from the bearing element or pivotal connection 8 and arranged with its lower end interposed between horizontally adjustable stop pins 9. The confronting ends of these stop pins are tipped with rubber as at 10. The upper end of the armature is provided with an angular extension or short arm 11, and carried thereby is a clip 12 in which a lever arm 13 is mounted and arranged to provide a long branch 14 at one side of the clip and a short branch 15 at the opposite side thereof. From the arrangement of parts thus far described, it manifestly follows that should the lever arm assume an absolute position of rest, the lower end of the armature will engage against the right hand stop 10 as shown in Figure 2.

The lever arm 13 is in the nature of a glass tube of suitable length and internal diameter, depending upon the intended distance the inertia mass shall travel and the quantity of material which goes to make up this mass. The inertia mass 16 which is contained within the tube consists of mercury and to prevent oxidation thereof, all air is excluded from said tube. At the free extremity of the long branch 14 of the tube and passing into the tube are positive and negative electrodes 17 and 18, the same adapted to be bridged by the mercury when the tube is oscillated in one direction.

We do not propose or expect to be limited to the manner of mounting the panel 6, but in order that the velocity of the mercury can be controlled very accurately to thus determine the elapsed time between the opening and the closing of the circuit in which the invention is a part, the panel is preferably hung at 19 to tilt about a horizontal axis and when same has been set at an intended angle, it may be operatively retained at such angle by securing means 20. The pivotal connection 19 may extend from a vertical support 21a. The securing means 20 may extend from the same said support, and, as shown, the shank 21 of said securing means is extended through an arcuate slot 22 in the lower portion of said panel in order that the head of said shank can tightly bear against the front of said panel. After the panel has been manually tilted to the desired angle, as shall be required, and firmly fixed at said angle to control or govern the velocity of the inertia mass, the aforementioned stops 9—9 can be adjusted to definitely limit the movement of the armature relatively to the core of the coil 5.

In Figure 4 is shown a conventional circuit 23 in which is contained the aforestated coil 5 and connected in said circuit is a lamp 24 which can be flashed periodically as the coil is energized. However, any other form of signaling device can be substituted for the lamp without departing from the spirit and intention of the invention. The positive and negative electrodes of the tube 13 are also operatively connected in said circuit, and said circuit is provided with a battery 25 for energizing said coil and for flashing said lamp 24.

Extending from the armature 7, preferably in horizontal alinement with the short arm 11 thereof, is a threaded stem 26 on which is mounted a correspondingly threaded weight that can be adjusted to any position between the ends of said stem, to thereby enable a perfectly balanced adjustment of the armature to be obtained, thus insuring greater accuracy and dependability of operation of the device.

Having described in detail the structural elements of the device, the operation is as follows: When the mercury bridges the electrodes 17 and 18, the circuit 23 will be closed and the coil 5 energized, thus causing the armature to be attracted and advanced against the left hand stop 9 in Figure 2. This obviously oscillates the tube 13 about the axis 8 and causes the mercury to instantly leave the electrodes and gravitate into the short branch of said tube, the closed end of which is now lower than the closed end of the long branch 14. As the force or impact of the mercury is partially arrested by the closed end of said short branch of the tube, mercury gravitates toward the closed end of the long branch 14 of said tube to again bridge the electrodes and thus close the circuit. It will be appreciated from what has been just stated that the tube when thus oscillated first in one direction and then the other not only enables the mercury to operate as set forth, but it determines the length of time the circuit shall remain open or closed. This time factor is, of course, due to the length of the tube; the amount of mercury which it contains and the angle of intended adjustment of the tube to control the velocity of the mercury from one end of the tube to the other end thereof.

So far as we know, we are the first in the art with means providing for the utilization of two co-operable forces for the production in a positive manner and at regularly timed intervals of kinetic energy. We shall broadly claim the use of power or force inductively produced and utilized to render active and operative a second force, and the use of the second force to again influence the inductive force.

We shall, therefore, claim broadly a system in which means are employed to effect an exchange or substitution of force created by magnetic induction for the force of gravity or vice versa, the two said forces being, therefore, wholly dependent upon each other to make relatively constant and certain the positive opening and closing of a circuit at predetermined periods of time.

Specifically, we shall make claim to an armature and its coil, in combination with an oscillatory body comprising a part of an electric system in which a circuit is opened and closed in consequence of respective oscillations of said body. And we shall claim the parts last named in combination with an electric circuit in which both the aforementioned coil and a signalling device are adapted to function in the manner set forth.

We attach importance also to the means herein disclosed for governing the velocity of the inertia mass 16 to enable the circuit closing intervals to be changed to suit varying requirements.

The invention is especially useful as a warning signal for the control of traffic along public highways, but in no manner shall this be construed as limiting the invention, it being obvious that it can be used in any environment where the forces herein employed can be commercially utilized to produce kinetic energy.

What is claimed is:

Circuit controlling means comprising an electromagnet, an armature and means by which it is pivoted at one end adjacently to the electromagnet, said armature having an arm near said end, adjusting means by which to confine the opposite and free end of the armature to a predetermined amplitude of movement with respect to the magnet core, an insulating tube attached to the arm, said tube containing a bridging mass of conductive material and the contacts of an electrical circuit which embraces the electromagnet, said tube being initially pitched in one direction to enable said mass to gravitate toward said contacts to close the circuit, the attraction of the armature by energization of the electromagnet causing the arm and tube to tilt in the opposite direction so that said mass gravitates from the contacts to open the circuit, a panel on which the electromagnet and its coacting parts are mounted, and a support with respect to which the panel is tiltably adjustable to vary the pitch of the tube and the velocity of said mass without changing the amplitude of movement of the armature.

MILFORD C. PHILLIPS.
VERNON HAVENNER.